US009621364B2

(12) United States Patent
Åström et al.

(10) Patent No.: US 9,621,364 B2
(45) Date of Patent: Apr. 11, 2017

(54) SWITCHING BETWEEN DELIVERY METHODS IN AN IPTV COMMUNICATION NETWORK

(75) Inventors: Bo Åström, Stockholm (SE); Peter Edlund, Tumba (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 679 days.

(21) Appl. No.: 12/993,324

(22) PCT Filed: May 19, 2008

(86) PCT No.: PCT/EP2008/056110
§ 371 (c)(1),
(2), (4) Date: Nov. 18, 2010

(87) PCT Pub. No.: WO2009/140994
PCT Pub. Date: Nov. 26, 2009

(65) Prior Publication Data
US 2011/0067081 A1    Mar. 17, 2011

(51) Int. Cl.
*H04N 7/173*    (2011.01)
*H04L 12/18*    (2006.01)
(Continued)

(52) U.S. Cl.
CPC ........ *H04L 12/189* (2013.01); *H04L 12/1836* (2013.01); *H04L 65/1083* (2013.01);
(Continued)

(58) Field of Classification Search
CPC ......... H04N 21/6408; H04N 21/41407; H04N 21/6125; H04N 21/6112; H04N 21/262;
(Continued)

(56) References Cited

U.S. PATENT DOCUMENTS 7,472,197 B2 * 12/2008 Li et al. .................. 709/231
8,640,166 B1 *  1/2014 Craner ............. H04N 21/4826
                                                        725/37

(Continued)

FOREIGN PATENT DOCUMENTS

CN            101009825 A      8/2007
WO    WO 2007068290 A1 *   6/2007

OTHER PUBLICATIONS

F. Hartung et al. : "Delivery of Broadcast Seivices in 3G Networks" IEEE Transactions on Broadcasting. [Online] vol. 53. No. 1, Mar. 1, 2007 (Mar. 1, 2007), pp. 188-199, XP002521053 Retrieved from the Internet: URL:http:/www.ericsson.com/technology/research_papers/multimedia_technologies/doc/Oelivery_of_Broadcast_Services_in_3G_Networks.pdf>.

(Continued)

*Primary Examiner* — Ngoc Vu (57) ABSTRACT

A method and apparatus for switching from a first IPTV channel arranged to be delivered to a plurality of nodes, such as a broadcast or a unicast, to a second unicast IPTV channel. The first IPTV channel is received at an IPTV receiving node, such as a User Equipment. If it is determined that the first IPTV channel is no longer available, then an IPTV content provider capable of providing the same IPTV channel in a unicast as the first IPTV channel is identified. A message is then sent to an IPTV AS, the message including an instruction to switch to a unicast IPTV channel and an address for the identified IPTV content provider node. The IPTV receiving node then receives the IPTV channel unicast.

15 Claims, 8 Drawing Sheets

(51) Int. Cl.
    H04N 21/61      (2011.01)
    H04N 21/6405    (2011.01)
    H04N 21/6408    (2011.01)
    H04N 21/643     (2011.01)
    H04L 29/06      (2006.01)
(52) U.S. Cl.
    CPC ..... H04N 21/6125 (2013.01); H04N 21/6405 (2013.01); H04N 21/6408 (2013.01); H04N 21/64322 (2013.01); *H04L 65/4076* (2013.01)
(58) Field of Classification Search
    CPC ........... H04N 21/6405; H04N 7/17318; H04N 21/2402; H04N 21/26616; H04N 21/23424; H04N 21/4384; H04N 21/436; H04N 21/64707; H04N 21/6371; H04N 21/64753
    USPC ..... 725/95, 110, 119, 120, 56; 709/217–219
    See application file for complete search history.

(56)         References Cited

U.S. PATENT DOCUMENTS

| 2004/0158855 | A1* | 8/2004 | Gu ................... H04N 5/44543 725/39 |
| 2006/0039367 | A1* | 2/2006 | Wright et al. ................ 370/382 |
| 2007/0107026 | A1* | 5/2007 | Sherer et al. .................. 725/97 |
| 2007/0190928 | A1* | 8/2007 | Nichols et al. ............... 455/3.01 |
| 2008/0022298 | A1* | 1/2008 | Cavicchia .......... H04N 5/44543 725/25 |
| 2008/0109853 | A1* | 5/2008 | Einarsson et al. ............. 725/62 |
| 2008/0207137 | A1* | 8/2008 | Maharajh et al. ............. 455/74 |
| 2009/0019509 | A1* | 1/2009 | Horn et al. .................. 725/118 |
| 2009/0100147 | A1* | 4/2009 | Igarashi ....................... 709/218 |
| 2009/0235315 | A1* | 9/2009 | Sharkey et al. ................ 725/68 |
| 2009/0293095 | A1* | 11/2009 | Karaoguz .......... H04N 7/17336 725/119 |

OTHER PUBLICATIONS

Einarsson MWesterlund T Lohmar I Johansson Ericsson T: "Multiple aggregated control URIs for RTSP; draft-einarsson-mmusic-rtsp-macuri-01.txt" IETF Standard-Working-Draft, Internet Engineering Task Force, IETF . CH, No. 1, Dec. 21, 2006 (Dec. 21, 2006), XP015047576 ISSN: 0000-0004.

Ericsson, et al. Fast Channel Switching for PSS Based Mobile TV. Internet Citation. Aug. 28, 2006. Retrieved from the Internet: www.3gpp.org/ftp/tsg_sa/WG4_CODEX/TSGSA4 PSM ADHoC. TDoc S4-AHP301. Oct. 20, 2006.

Ericsson. Use-Case and Requirements for Fast Channel Switching. 3GPP TSGSA4 PSM ADHoC. TDoc S4-AHP301. Oct. 20, 2006.

OMA Open Mobile Alliance. Service Guide for Mobile Broadcast Services. OMA-TS-BCAST-V1_0_20080226-C.

* cited by examiner

SWITCHING BETWEEN DELIVERY METHODS IN AN IPTV COMMUNICATION NETWORK

TECHNICAL FIELD

The invention relates to the field of IPTV communication networks, and in particular to switching between broadcast/multicast and unicast delivery of IPTV.

BACKGROUND

TV services broadcast over an IP network are referred to as IPTV. IPTV is typically broadcast using a broadband access network, in which channels are transmitted over a broadband network from a super head-end down to an end-user's set top box (STB). An example of an IPTV service is Broadcast TV, in which the most common IPTV channels, as well as additional channels with low penetration, are transmitted over a broadband network from a super head-end down to an end-user's set top box (STB). In order to minimize the bandwidth required for these transmissions it is desirable to use multicast techniques through the network.

Similarly, in mobile networks it is desirable to use broadcast/multicast delivery of Mobile TV (MTV). Multimedia Broadcast Multicast Service (MBMS) and Digital Video Broadcasting-Handheld (DVB-H) are examples of MTV broadcast technologies. A mobile telephone having an MTV client can be thought of as an equivalent to a STB in MTV implementations that receive content from a super head-end. The term "Linear TV" is used to refer to "live" ITV, which is typically delivered by broadcasting.

The same set of channels delivered over broadcast bearers may in mobile networks also be offered over dedicated unicast bearers. In this scenario, each user is allocated a dedicated channel. This is in contrast to a common bearer used in broadcast delivery over, for example, MBMS. Even though allocating a dedicated channel is less efficient from a transmission point of view, it is a pragmatic solution for many mobile networks in which broadcast delivery is not available in all geographical areas (cells). A network operator may choose to only implement MBMS in areas with high subscriber density. In some areas, MBMS has not yet been implemented, and in other areas, MBMS may never be implemented. This creates a need for delivering Linear TV over both broadcast and unicast bearers.

Furthermore, a user may start viewing an IPTV channel over an MBMS broadcast bearer, and subsequently move into an area where MBMS is not supported. In this scenario, it is necessary to switch from a broadcast delivery of Linear TV to a unicast delivery. Such a switch should be as smooth as possible and cause the least disruption to the user's viewing.

Currently there is no mechanism for switching between broadcast/multicast and unicast delivery of Linear TV.

SUMMARY

The inventors have realised that no mechanism exists for switching between delivery methods in an IPTV network, and in particular to switching from a broadcast or multicast IPTV channel to a unicast IPTV channel when the broadcast/multicast IPTV channel becomes unavailable. This may occur, for example, when an MTV user moves from an area in which broadcast/multicast IPTV is supported to an area in which broadcast IPTV is not supported. According to a first aspect of the invention, there is provided a method of switching from a first IPTV channel arranged to be delivered to a plurality of nodes to a second unicast IPTV channel. The method comprises receiving the first IP television channel at an IPTV receiving node, such as a User Equipment. If it is determined that the first IPTV channel is no longer available, then an IP television content provider capable of providing the same IPTV channel in a unicast as the first IPTV channel is identified. A message is then sent to an IPTV Application Server (AS), and the message includes an instruction to switch to a unicast IPTV channel and an address for the identified IPTV content provider node. The IPTV receiving node then receives the IPTV channel unicast.

The method is optionally suitable for use where the first IPTV channel is delivered by either a broadcast or a multicast. In most cases the IPTV receiving node is capable of receiving a plurality of channels, and so the instruction to switch to a unicast IP television channel optionally applies to all IP television channels provided to the IPTV receiving node.

As an option, the IPTV channels are provided in a Mobile IP television network. In this case, the determination that the first IPTV channel is no longer available may made as a result of the IPTV receiving node moving to an area in which the first IPTV channel is not provided. This is because some networks do not provide broadcast or multicast IPTV at all, but only unicast IPTV.

As an option, the IPTV content provider capable of providing the same IPTV channel in a unicast is identified from data contained in an Electronic Programme/Service Guide (ESG/EPG) stored at the IPTV receiving node.

The method is particularly suitable for use where the IPTV AS is located in an IMS network, in which case the message is a SIP Invite message. Note that SIP signalling may also be used in networks other than IMS networks. Where SIP signalling is used, the instruction to switch to a unicast IP television channel is optionally contained in a Service Action Data parameter in the SIP Invite message.

The user may subsequently move into an area where a broadcast or multicast is once again available. If it is determined that the first IP television channel is available, then the method optionally comprises identifying an IP television content provider capable of providing the first IP television channel, and sending a further message to the IP television Application Server. The further message includes an instruction to switch to the first IP television channel and an address for the identified broadcast IP television content provider. The IPTV receiving node once again receives the first IP television channel.

According to a second aspect of the invention, there is provided a receiving node for receiving an IP television channel. A first receiver is provided for receiving a first IPTV channel that is arranged to be delivered to a plurality of nodes. Examples of such an IPTV channel are multicast and broadcast channels. A first processor is arranged to determine that the first IPTV channel is no longer available, and a second processor is used for identifying an IPTV content provider capable of providing the same IP television channel in a unicast as the first IPTV channel. A transmitter is provided for sending a message to an IPTV AS. The message includes an instruction to switch to a unicast IP television channel and an address for the identified IPTV content provider. A second receiver is also provided for receiving the unicast IPTV channel.

As an option, the receiving node is a mobile device such as User Equipment in an IMS network.

The receiving node optionally comprises a memory for storing an Electronic Program/Service guide, the Electronic Program/Service guide comprising information about broadcast and unicast IP television channels. This information is used to identify the IPTV content provider capable of providing the same IP television channel in a unicast as the first IPTV channel.

According to a third aspect of the invention, there is provided an IPTV AS. The IPTV AS has a first receiver for receiving from an IPTV receiving node a SIP Invite message, the SIP invite message including an instruction to switch to a unicast IP television channel and an address for an IP television content provider node, and a first transmitter for sending to the identified content provider a message requesting that the unicast IP television channel is provided to the IP television receiving node.

DETAILED DESCRIPTION

The following description sets forth specific details, such as particular embodiments, procedures, techniques, etc. for purposes of explanation and not limitation. In some instances, detailed descriptions of well known methods, interfaces, circuits, and devices are omitted so as not obscure the description with unnecessary detail. Moreover, individual blocks are shown in some of the drawings. It will be appreciated that the functions of those blocks may be implemented using individual hardware circuits, using software programs and data, in conjunction with a suitably programmed digital microprocessor or general purpose computer, using application specific integrated circuitry, and/or using one or more digital signal processors.

Figure 1:
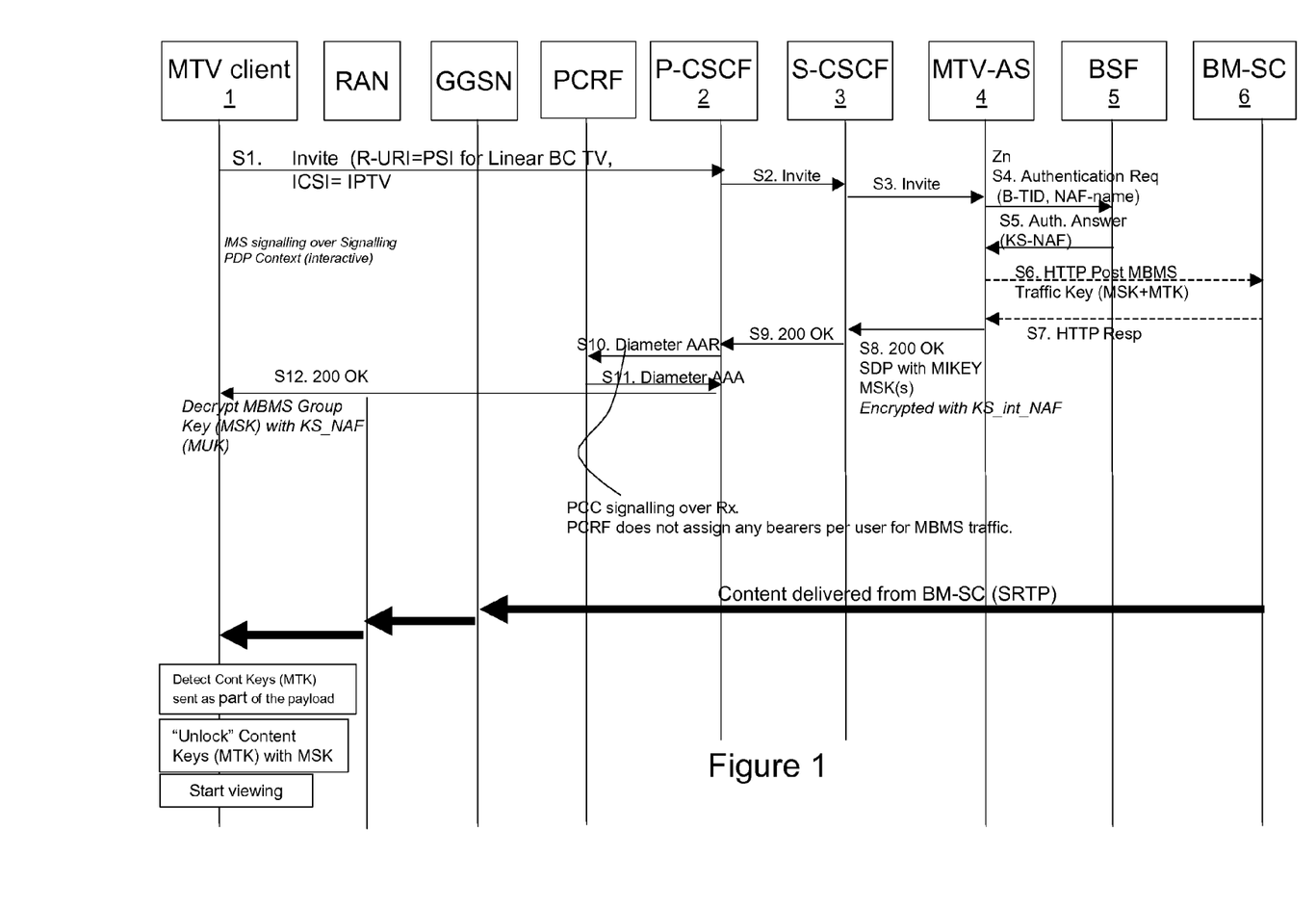
FIG. 1 illustrates schematically in a block diagram the signalling required to receive a MTV broadcast at a MTV client.

Referring now to FIG. 1, an existing procedure for broadcast delivery of Linear TV, which could be IPTV, or more specifically MTV, is shown. The example illustrates the signalling between nodes in an IP Multimedia Subsystem (IMS) network, but similar signalling could apply in other types of network. For example, whilst the following example refers to SIP signalling, other types of signalling such a HTTP may be used. The following numbering corresponds to the numbering in FIG. 1.

S1. An MTV Client 1 sends an Invite requesting access to broadcast Linear TV content. The MTV service is identified in the Invite using an IMS Communication Service Identifier (ICSI) for the IPTV communication service, and a Public Service Identifier (PSI) for the MTV Service Provider of broadcast TV. The Invite is sent to a Proxy-Call Session Control Function (P-CSCF) 2.

S2. The P-CSCF 2 forwards the Invite to a Serving-Call Session Control Function (S-CSCF) 3.

S3. The S-CSCF 3 uses the ICSI to identify the MTV service and sends the Invite to a MTV Application Server (MTV-AS) 4. In this example, the MTV service provider and the IMS operator are the same entity, although they may be separate entities. This allows user specific originating triggers (originating S-CSCF 3) to invoke the MTV AS 4.

S4-S5. The MTV-AS 4 is responsible for content key handling for IPTV. Before users are allowed to use the IPTV over IMS solution, they are authenticated to access IMS services using inherent IMS security provided by e.g. IMS AKA. For traffic (signalling and payload) that is not transferred over IMS, users are authenticated with GBA procedures. HTTP for EPG (Electronic Program Guide) retrieval is an example of such signalling. A Bootstrapping Server Function (BSF) in the GBA architecture performs the authentication of non-IMS traffic, and a subscriber specific key named Ks_NAF is generated as part of the procedure.

S6. The MTV-AS 4 is responsible for delivering the content keys to a Broadcast Multicast Service Centre (BM-SC) 6, which is responsible for delivering broadcast content to the MTV client 1.

S8-12. The MBMS Group Key (MSK) is delivered to the MTV Client 1, after which the MTV client 1 can begin content access for MBMS delivered content from the BM-SC 6. Ks_NAF, which was generated during the GBA bootstrapping procedure, may be used to encrypt the MSK when it is sent to the receiving node at which the MTV client 1 is located. An example of such a receiving node is User Equipment (UE). Other means to deliver the MSK to the UE could also be used. Decoding of the traffic channel (MTCH) is started by the UE. The MTK (content keys) that are sent over the MTCH are decrypted with the MSK, to allow the content to be decrypted. The MTK is used to decode Secure Real-time Transport Protocol (SRTP) content before it can be rendered for the user to view. Note that secure payload formats other than SRTP could also be used.

Figure 2:
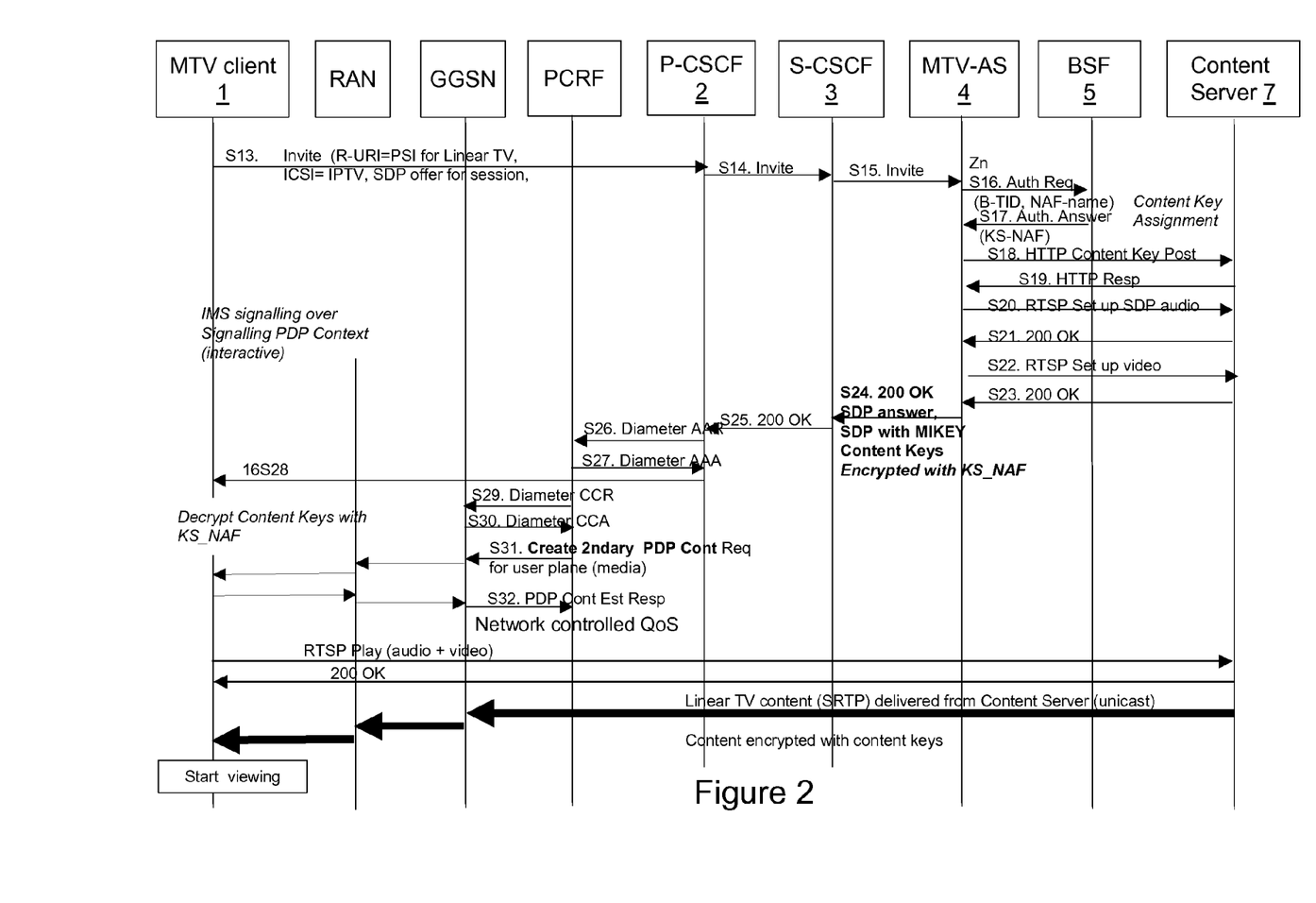
FIG. 2 illustrates schematically in a block diagram the signalling required to receive a MTV unicast at a MTV client.

Referring now to FIG. 2, an existing procedure for session establishment for unicast delivery of Linear TV is shown. The example illustrates the signalling between nodes in an IP Multimedia Subsystem (IMS) network, but similar signalling could apply in other types of network.

In steps S13 to S32 of FIG. 2, the MTV client 1 establishes a session/connection for media delivery to a Content Server 7 for Linear TV by sending an Invite with a PSI for unicast delivery of Linear TV, and optionally identification of the TV service (ICSI). The MTV client obtains the necessary URIs for Linear TV channels using a previously executed Electronic Programme Guide (EPG) retrieval procedure. It is possible for the MTV client 1 to probe the Content Server 7 to ascertain whether if it supports fast channel switching.

Note that all channels available in the Linear TV offering from the Service Providers are delivered over the same unicast bearer. One channel is delivered at any one time, and if a user changes from channel to another, the content server 7 changes the programme currently delivered to the MTV client 1.

In the broadcast case described above, all of the channels are transmitted on the broadcast channel from the BM-SC 6, and a channel switch can be performed locally at the UE in which the MTV client 1 is located. However, for a unicast, channel switching must be performed at the media source (the content server 7), as illustrated in FIG. 3.

Fast channel switching was introduced in 3GPP PSS (Packet Streaming Service) to enable a channel switch at the media source, without requiring the establishment of a new RTSP session for the new channel. In step S33, the client 1 is receiving audio and video data for channel 1 from a Content Server 7. The user then decides to change channel, so the client 1 is instructed to send in step S34 a "Play Command" that contains a channel indication (c2 in this example) to the Content Server 7. In step S35, the Content Server replies with a 200 OK message, and in step S36 the Content Server 7 provides the client 1 with audio and video for channel 2.

Figure 3:
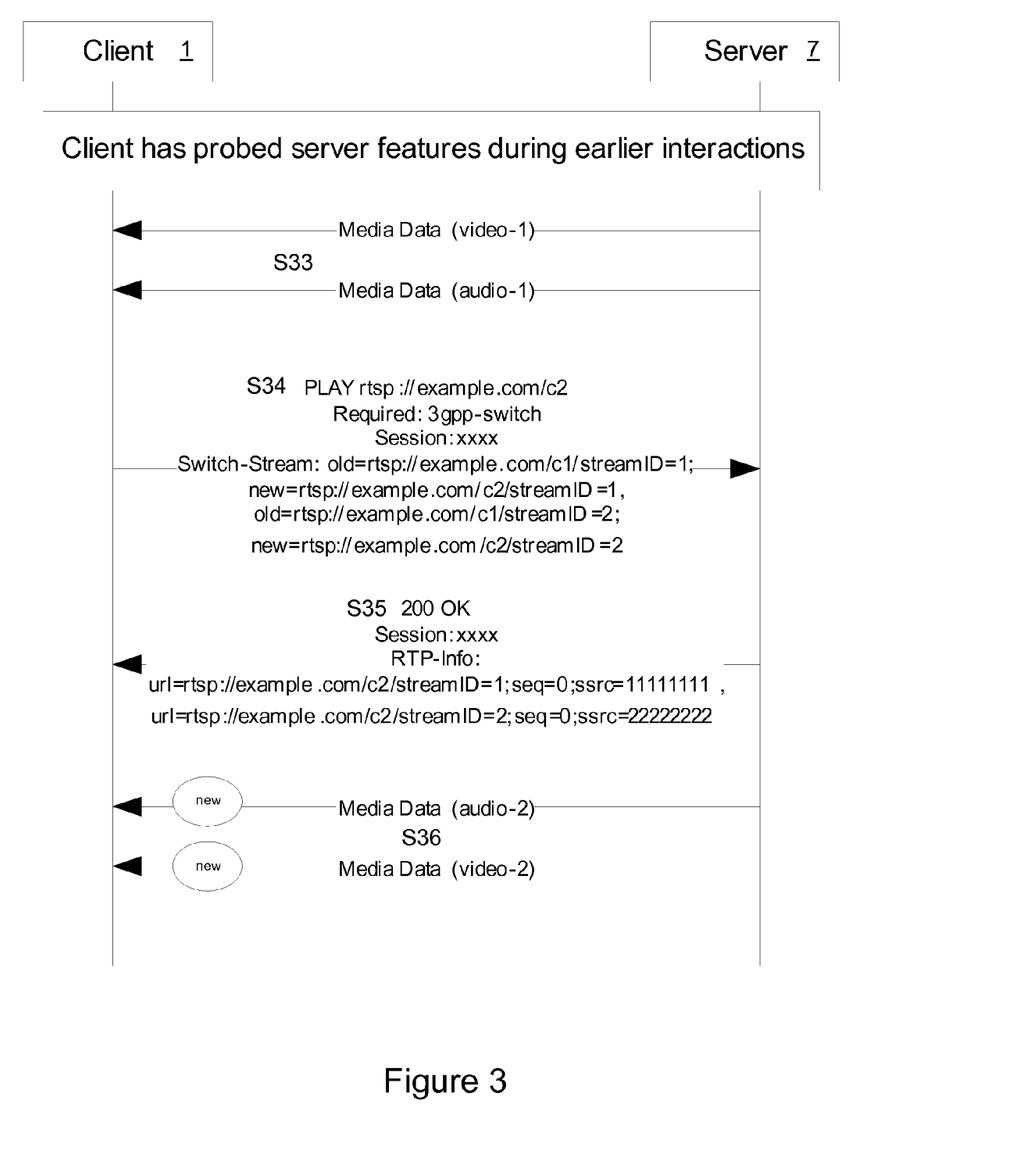
FIG. 3 illustrates schematically in a block diagram the signalling required for fast channel switching at an MTV client for a MTV unicast.
Figure 4:
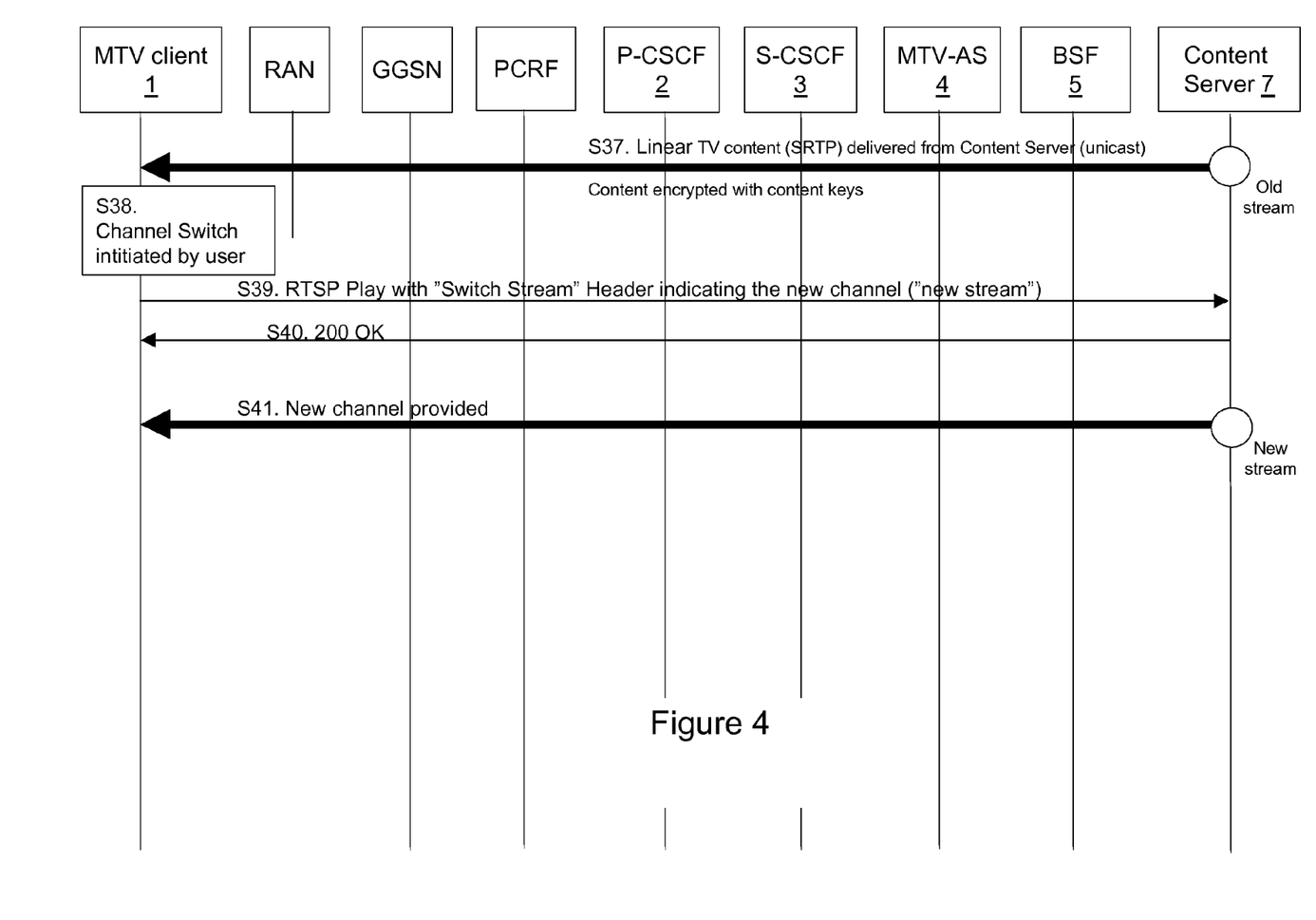
FIG. 4 illustrates schematically in a block diagram the signalling required for fast channel switching at an MTV client for an IP Multimedia Subsystem delivered MTV unicast.

A similar capability is provided in the IMS delivered MTV solution, and, as with the PSS solution illustrated in FIG. 3, it requires that the media source performs the switch between the channels. FIG. 4 illustrates Fast Channel Switching (FCS) in an IMS delivered Mobile TV unicast. In step S37, a Content Server 7 provides the MTV client 1 with media for a first channel. In step S38, the user initiates a channel switch, and in step S39 the MTV client 1 sends to the Content Server 7 a RTSP Play message including a "Switch Stream" header that identifies the required new channel. The Switch-Stream header contains information about the old and new streams expressed as RTSP URLs. In step S40, the Content Server 7 replies with a 200 OK message, and in step S41, the Content Server 7 starts to send media for the new channel to the MTV client 1.

Figure 5:
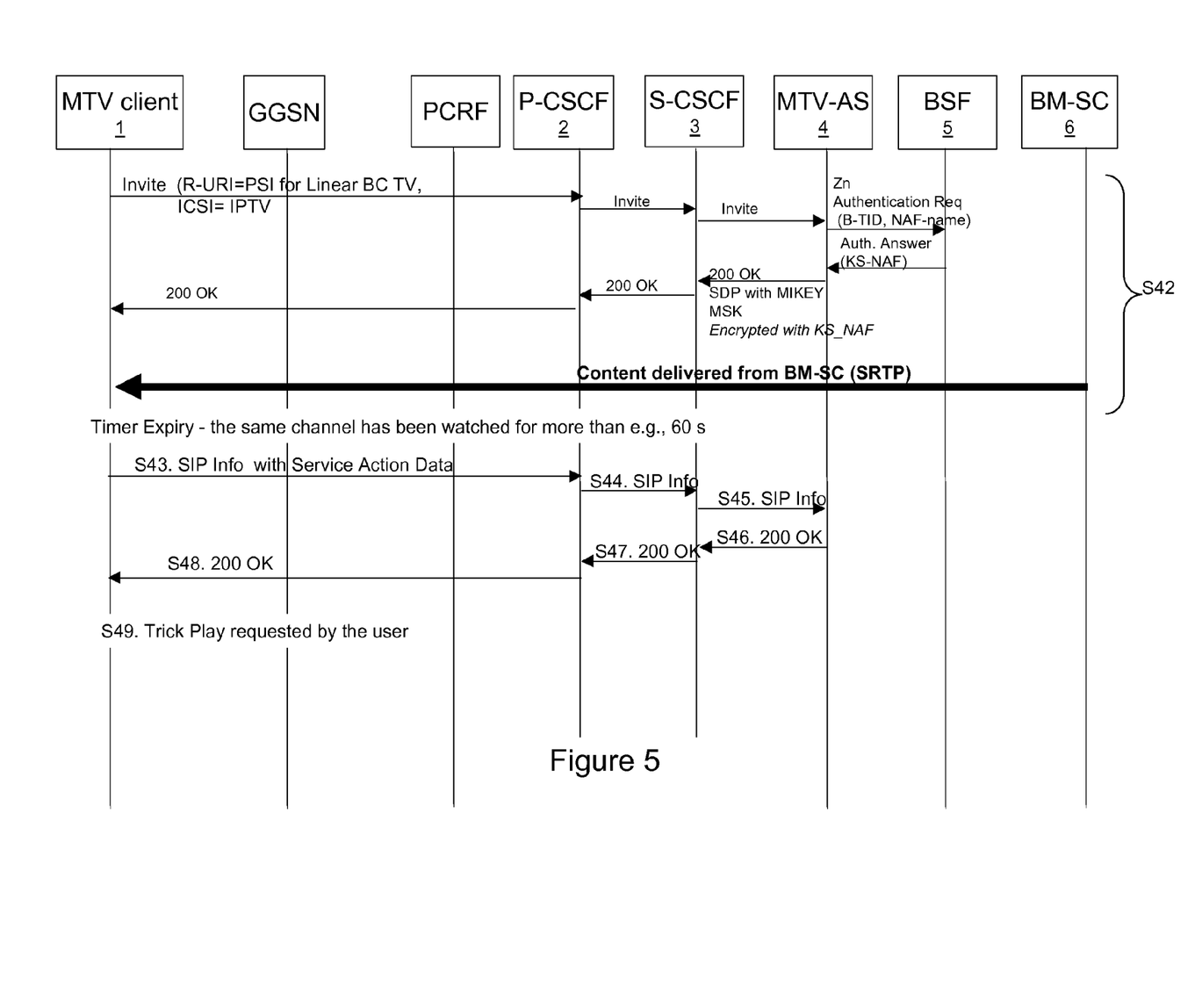
FIG. 5 illustrates schematically in a block diagram the signalling required for establishing a broadcast IPTV session.

Turning now to FIG. 5, Trick Play is defined in Tispan (IPTV, MTV) and gives the user the ability to control an IPTV broadcast with actions such as Play, Pause, Stop, in a similar manner to the way in which a VCR or DVD player can be used to control video playback. Trick Play functions should only apply to that user and not all users, and so where media is delivered in a broadcast and a user initiates Trick Play, the media must be provided in a unicast for that user. This is described in the Tispan IPTV specification and will serve as a basis for the Mobile TV standardization in 3GPP "IMS initiated and controlled MBMS and PSS".

FIG. 5 shows the change from Linear broadcast TV to Trick Play control for one specific channel.

S42. The MTV Client 1 establishes a session for reception of Broadcast Linear TV as previously described.

S43-48. When a user has stayed with a particular broadcast channel for a certain time, the MTV AS 4 is updated with information about the currently viewed channel. The update is sent using SIP signalling via the P-CSCF 2 and the S-CSCF 3. A SIP Info containing a Service Action Data information element is sent, and the information can be used for statistical purposes. It may include BC Service Id, Programme Id, etc S49. The user then requests Trick Play. MTV Client 1 sends a Re-invite using the established SIP dialogue to the P-CSCF 2. The Invite contains a Service Action Data information element with an indication to "switch to Trick Play". If SIP Info with the required Service Action Data has not previously been sent with information about the currently viewed channel, then channel information is included in the Service Action Data. The Invite includes SDP information for audio, video and TCP (the latter is required because RTSP commands will be sent over TCP). The Re-invite message is sent to the MTV AS 4 via the S-CSCF 3, and the MTV AS 4 negotiates the audio and video RTSP set-up with the Media Server (MCF/MDF in Tispan) 8. The MTV AS 4 may use SIP or RTSP to establish a session with the Media Server/n-PVR. The MTV Client can however directly send RTSP commands to control a Personal Video Recorder (PVR) via the established TCP connection without mediation and involvement by the MTV AS 4. An example of such a command is to Pause the linear TV unicast.

The above described signalling is modified according to the invention to allow for switching between broadcast and unicast delivery of Linear TV.

Information about available TV channels and how they are delivered (broadcast or unicast) is found in the EPG/ESG and this information instructs the MTV client 1 if broadcast or unicast delivery is used for a certain channel. When Linear TV is delivered by both broadcast and unicast delivery, addresses and other information necessary for unicast and broadcast delivery are included together with an indication of the operator's preferred choice (e.g. always use MBMS if available in the current area).

When requesting Trick Play, unicast is requested for one channel only. However, if it is detected that broadcast delivery of Linear TV is no longer available, for example because a mobile user moves to an area where MBMS broadcast is not supported, then it will be necessary to move to unicast delivery of all channels.

When it is required to switch from broadcast to unicast delivery of Linear TV, the initial signalling is the same as that shown in FIG. 5, with the exception that Trick Play is not requested. The following signalling, with numbering corresponding to that shown in FIG. 6, S50. The MTV client 1 sends a Re-invite using the established SIP dialogue to the P-CSCF 2. The Re-Invite contains a Service Action Data information Element with an indication of "Switch to Unicast Delivery" defined as a new value for the Service Action Data information element. This indication informs the MTV AS 4 which content server (in this case, the MDF/Content 8) should be used, and the content server must provide unicast Linear TV. The request for unicast delivery applies to all channels provided to the MTV client.

Figure 6:
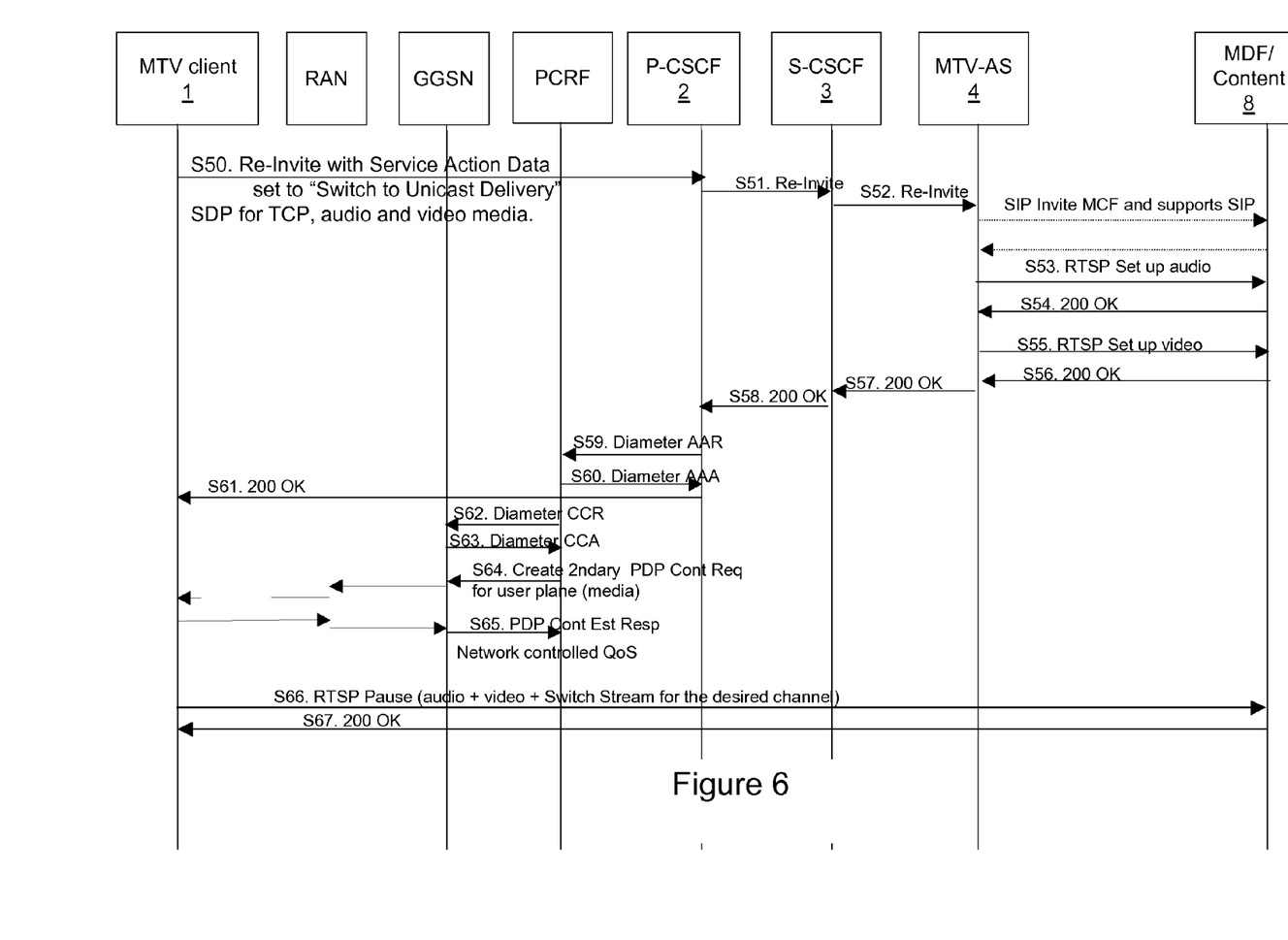
FIG. 6 illustrates schematically in a block diagram further signalling required to change from a broadcast to a unicast delivery according to an embodiment of the invention.

S51-52. The SIP Re-invite is sent to the MTV AS 4 via the S-CSCF 3.

S53-56. The MTV AS 4 negotiates the audio and video RTSP set-up with the Media Server (MCF/MDF) 8. The RTSP Play command contains the channel that the user wishes to watch, i.e. typically the channel the user was watching via broadcast delivery before the switch to unicast delivery became necessary.

S57-61. A SIP 200 OK is returned to the MTV Client 1 in response to the Re-Invite message sent in S50.

S62-65. IMS Policy and Charging Control (PCC) functionality is used to assign an appropriate bearer (defined by QoS requirements) for the unicast IPTV delivery. These steps show a network controlled bearer establishment/PDP context, but a UE controlled bearer establishment could also be used.

S66-67. The MTV client 1 initiates the RTSP stream for the selected unicast channel to complete the switch to unicast channel delivery.

Of course, if a user then moves back into an area that does support delivery of Linear TV by broadcast, the same signalling as described above can be used to switch back from unicast to broadcast, simply by sending a re-invite similar to that in step S50, but with the Service Action Data Element having in indication of "Switch to Broadcast delivery".

Figure 7:
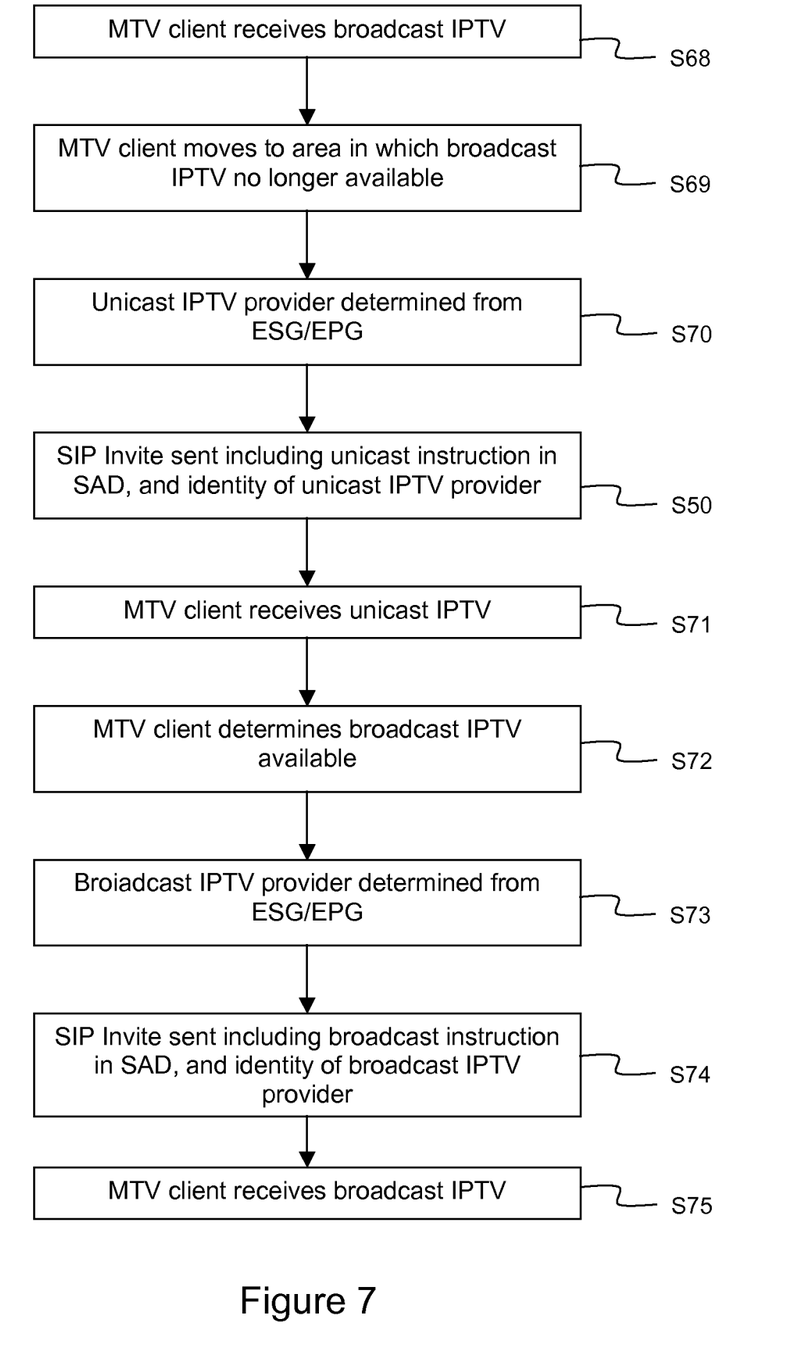
FIG. 7 is a flow diagram showing the steps of an embodiment of the invention.

Referring now to FIG. 7, an exemplary embodiment of the invention is described below. The following numbering corresponds to the steps shown in FIG. 7.

S68. An MTV client 1 receives a broadcast IPTV channel.

S69. The MTV client 1 moves to a geographical area in which broadcast IPTV is not available, and a determination that broadcast IPTV is not available is made.

S70. The MTV client 1 determines a unicast channel providing the same media as the broadcast IPTV channel from data contained in the ESG or EPG.

S50. A SIP Re-invite is sent to the MTV-AS 4 that includes an instruction to switch to the unicast IP television, and an address for the identified IP television content provider node.

S71. The MTV client now receives the unicast IPTV channel rather than the broadcast IPTV channel.

S72. In the event that the MTV client 1 subsequently moves to an area where broadcast IPTV is available, a determination is made that broadcast IPTV is available.

S73. The MTV client 1 determines a broadcast channel providing the same media as the unicast IPTV channel from data contained in the ESG or EPG.

S74. A SIP Re-invite is sent to the MTV-AS 4 that includes an instruction to switch to broadcast IP television, and an address for the identified broadcast IP television content provider node. The MTV client 1 in the UE will typically tune in to the TV channel watched by the user before the switch from unicast to broadcast.

S75. The MTV client now receives the broadcast IPTV channel rather than the unicast IPTV channel.

Figure 8:
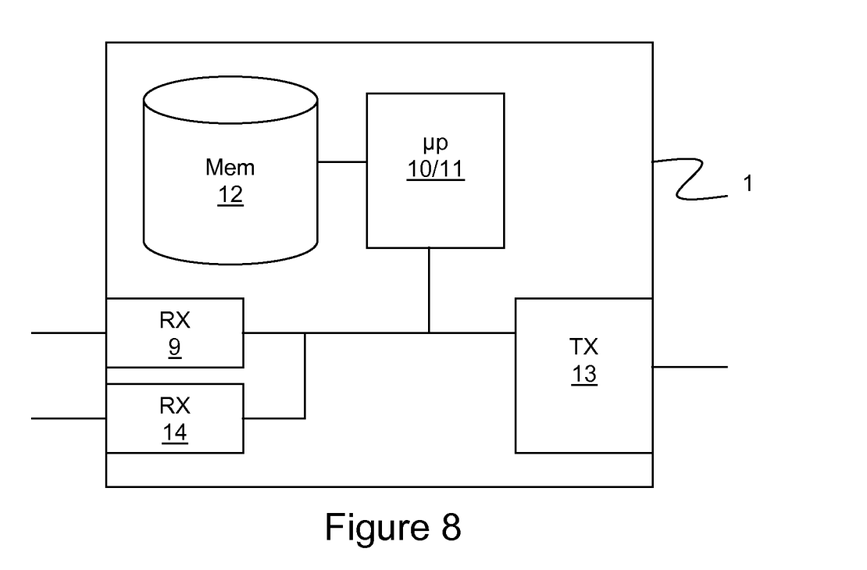
FIG. 8 illustrates schematically in a block diagram a MTV client node according to an embodiment of the invention.

Turning now to FIG. 8, there is illustrated a MTV client node 1 according to an embodiment of the invention. The MTV client node 1 has a first receiver 9 for a broadcast IP television channel, and a first processor 10 for determining that the broadcast IPTV channel is no longer available. A second processor 12, which is typically the same processor as the first processor, is provided for identifying an IP television content provider capable of providing the same IP television channel in a unicast as the broadcast IP television channel. This determination is made from ESG/EPG data stored in a memory 12. A transmitter 13 is provided for sending a SIP Invite message to a MTV-AS 4, the SIP Invite message including an instruction to switch to a unicast IP television channel and an address for the identified IP television content provider. A second receiver 14 is also provided for receiving the unicast IP television channel.

Figure 9:
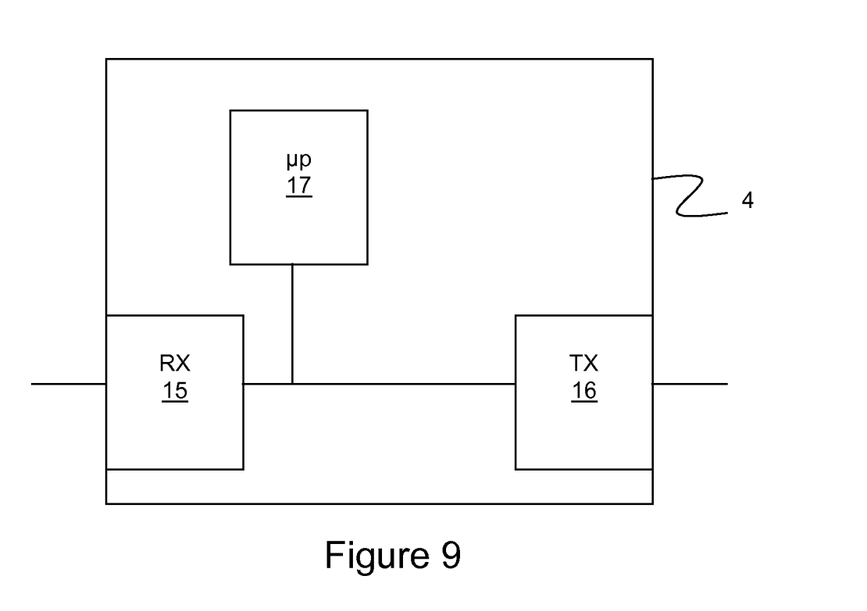
FIG. 9 illustrates schematically in a block diagram a MTV Application Server according to an embodiment of the invention.

FIG. 9 herein illustrates an MTV AS 4 according to an embodiment of the invention. The MTV AS 4 has a receiver 15 for receiving from the MTV client 1 a SIP Invite message, the SIP Invite message including an instruction to switch to a unicast IP television channel and an address for an IP television content provider. A transmitter 16 is also provided for sending to the identified content provider a message requesting that the unicast IP television channel is provided to the MTV client 1. A processor 17 is also provided for managing signalling.

The invention provides a smooth and fast switch between Linear TV delivered over broadcast and unicast bearers. A new value is introduced into signalling procedures that is used for requesting a change of the delivery method from broadcast to unicast.

It will be appreciated by the person of skill in the art that various modifications may be made to the above-described embodiments without departing from the scope of the present invention. For example, whilst the above description discusses the invention in the context of a Mobile TV network, and a loss of broadcast IPTV because a user roams to an area in which broadcast IPTV is not available, it will be appreciated that the invention also applies to fixed access IPTV networks where an IPTV broadcast becomes unavailable. This may be, for example, due to a failure of the broadcast IPTV server.

The following abbreviations have been used in this specification:

CoD: Content on Demand
EPG: Electronic Programme Guide
ESG: Electronic Service Guide
DVB-H Digital Video Broadcasting-Handheld
GBA Generic Bootstrapping Architecture
GAA Generic Authentication Architecture
HTTP: Hypertext Transfer Protocol
Linear TV "Live TV"
MCF Media Control Function
MDF Media Delivery Function
MSK MBMS Session Key
MTK MBMS Traffic Key
MTV: Mobile TV
MBMS Multimedia Broadcast Multicast Service (MBMS)
nPVR: Network based Personal Video Recorder
STB: Set Top Box
SRTP Secure Real-time Transport Protocol
Head-end The central part of an IPTV distribution system responsible for Programme Acquisition, content encoding, access right management, etc
Trick Play The ability to control the Linear TV broadcast with actions similar to the actions possible to perform on a VCR/DVD-Player such as Play, Pause, Stop, etc.
URI: Uniform Resource Identifier
XCAP: XML Configuration Access Protocol.
XDMS: XML Data Management Server

The invention claimed is:

1. A method of switching from a first Internet Protocol (IP) television channel arranged to be delivered to a plurality of nodes, to a second unicast IP television channel, the method comprising:
   at an IP television receiving node, receiving the first IP television channel;
   determining that the first IP television channel is no longer available;
   in response to determining that the first IP television channel is no longer available, identifying an IP television content provider node capable of providing a same media as the first IP television channel in a unicast;
   sending a Session Initiation Protocol (SIP) re-invite message to an IP television Application Server, the SIP re-invite message including an instruction to switch to the second unicast IP television channel and an address for the IP television content provider node, informing the IP television Application Server to use the identified IP television content provider node for the second unicast IP television channel; and
   receiving the second unicast IP television channel.

2. The method according to claim 1, wherein the first IP television channel is arranged to be delivered using one of a broadcast method and a multicast delivery method.

3. The method according to claim 1, wherein the instruction to switch to the second unicast IP television channel applies to all IP television channels provided to the IP television receiving node.

4. The method according to claim 1, wherein the first and second unicast IP television channels are provided in a Mobile IP television network.

5. The method according to claim 1, wherein a determination that the first IP television channel is no longer available is made as a result of the IP television receiving node moving to an area in which the first IP television channel is not provided.

6. The method according to claim 1, wherein the IP television content provider node capable of providing the same media in the unicast is identified from data contained in an Electronic Program/Service Guide stored at the IP television receiving node.

7. The method according to claim 1, wherein the IP television Application Server is located in an IP Multimedia Subsystem network.

8. The method according to claim 1, wherein the message is a Session Initiation Protocol (SIP) Invite message.

9. The method according to claim 8, wherein the instruction to switch to the second unicast IP television channel is contained in a Service Action Data parameter in the SIP Invite message.

10. The method according to claim 1, further comprising:
determining that the first IP television channel is available;
identifying a broadcast IP television content provider node capable of providing the first IP television channel;
sending a further message to the IP television Application Server, the further message including an instruction to switch to the first IP television channel and an address for the broadcast IP television content provider node; and
receiving the first IP television channel.

11. A receiving node for receiving an Internet Protocol (IP) television channel, the node comprising:
a first receiver for receiving a first IP television channel that is arranged to be delivered to a plurality of nodes;
a first processor for determining that the first IP television channel is no longer available;
a second processor for identifying an IP television content provider node capable of providing a same media as the first IP television channel in a unicast, responsive to determining that the first IP television channel is no longer available;
a transmitter for sending a Session Initiation Protocol (SIP) re-invite message to an IP television Application Server, the SIP re-invite message including an instruction to switch to the second unicast IP television channel and an address for the IP television content provider node, and informing the IP television Application Server to use the identified IP television content provider node for the second unicast IP television channel; and
a second receiver for receiving the second unicast IP television channel.

12. The receiving node according to claim 11, wherein the receiving node is a mobile device.

13. The receiving node according to claim 11, further comprising a memory for storing an Electronic Program/Service guide, the Electronic Program/Service guide comprising information about broadcast and unicast IP television channels.

14. An Internet Protocol (IP) television Application server comprising:
a first receiver for receiving from an IP television receiving node a Session Initiation Protocol (SIP) Re-Invite message, the SIP Re-Invite message including an instruction to switch and provide a same media to a unicast IP television channel from an IP television channel arranged to be delivered to a plurality of nodes and an address for an IP television content provider node for providing the same media, the SIP Re-Invite message informing the IP television Application Server to use the identified IP television content provider node for the second unicast IP television channel; and
a first transmitter for sending to the IP television content provider node a message requesting that the unicast IP television channel be provided to the IP television receiving node.

15. A method of switching from a first Internet Protocol (IP) television channel arranged to be delivered to a plurality of nodes, to a second unicast IP television channel, the method comprising:
at an IP television receiving node, receiving the first IP television channel, wherein the first IP television channel is provided by a first IP television content provider node;
determining that the first IP television channel is no longer available;
in response to determining that the first IP television channel is no longer available, identifying a second IP television content provider node capable of providing a same media as the first IP television channel in a unicast;
sending a Session Initiation Protocol (SIP) re-invite message to an IP television Application Server, the SIP re-invite message including an instruction to switch to the second unicast IP television channel and an address for the second IP television content provider node, wherein the second IP television channel is provided by the second IP television content provider and , informing the IP television Application Server to use the identified IP television content provider node for the second unicast IP television channel; and
receiving the second unicast IP television channel.

* * * * *

UNITED STATES PATENT AND TRADEMARK OFFICE
CERTIFICATE OF CORRECTION

PATENT NO. : 9,621,364 B2
APPLICATION NO. : 12/993324
DATED : April 11, 2017
INVENTOR(S) : Åström et al.

It is certified that error appears in the above-identified patent and that said Letters Patent is hereby corrected as shown below:

On the Title Page

In Item (56), under "OTHER PUBLICATIONS", in Column 2, Lines 2-3, delete "vol. 53. No. 1, Mar. 1, 2007 (Mar. 1, 2007)," and insert -- vol. 53, No. 1, Mar. 1, 2007, --, therefor.

On Page 2, in Item (56), under "U.S. PATENT DOCUMENTS", in Column 1, Line 1, delete "Gu" and insert -- Gu et al. --, therefor.

On Page 2, in Item (56), under "OTHER PUBLICATIONS", in Column 2, Lines 8-9, delete "www.3gpp.org/ftp/tsg_sa/WG4_CODEX/TSGSA4 PSM ADHoC. TDoc S4-AHP301. Oct. 20, 2006." and insert -- www.3gpp.org/ftp/tsg_sa/WG4_CODEX/TSGS4_40Docs. --, therefor.

On Page 2, in Item (56), under "OTHER PUBLICATIONS", in Column 2, Line 13, delete "OMA-TS-BCAST-V1_0_20080226-C." and insert -- OMA-TS-BCAST-V1_0-20080226-C. --, therefor.

In the Specification

In Column 1, Line 32, delete ""live" ITV," and insert -- "live" TV, --, therefor.

In Column 2, Line 24, delete "may made" and insert -- may be made --, therefor.

In Column 2, Line 32, delete "(ESG/EPG)" and insert -- (EPG/ESG) --, therefor.

In Column 4, Line 35, delete "MBMS Group Key (MSK)" and insert -- MBMS Service Key (MSK) --, therefor.

In Column 4, Line 43, delete "traffic channel (MTCH)" and insert -- Multicast traffic channel (MTCH) --, therefor.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,621,364 B2

In Column 6, Line 34, delete "FIG. 6," and insert -- FIG. 6. --, therefor.

In Column 7, Line 39, delete "second processor 12," and insert -- second processor 11, --, therefor.

In Column 8, Line 14, delete "DVB-H" and insert -- DVB-H: --, therefor.

In Column 8, Line 15, delete "GBA" and insert -- GBA: --, therefor.

In Column 8, Line 16, delete "GAA" and insert -- GAA: --, therefor.

In Column 8, Line 18, delete "Linear TV" and insert -- Linear TV: --, therefor.

In Column 8, Line 19, delete "MCF" and insert -- MCF: --, therefor.

In Column 8, Line 20, delete "MDF" and insert -- MDF: --, therefor.

In Column 8, Line 21, delete "MSK MBMS Session" and insert -- MSK: MBMS Service --, therefor.

In Column 8, Line 22, delete "MTK" and insert -- MTK: --, therefor.

In Column 8, Line 24, delete "MBMS" and insert -- MBMS: --, therefor.

In Column 8, Line 24, delete "Service (MBMS)" and insert -- Service --, therefor.

In Column 8, Line 25, delete "nPVR:" and insert -- NPVR: --, therefor.

In Column 8, Line 27, delete "SRTP" and insert -- SRTP: --, therefor.

In Column 8, Line 28, delete "Head-end" and insert -- Head-end: --, therefor.

In Column 8, Line 31, delete "Trick Play" and insert -- Trick Play: --, therefor.

In Column 8, Line 35, delete "Protocol." and insert -- Protocol --, therefor.

In Column 8, Line 36, delete "Data Management Server" and insert -- Document Management Server. --, therefor.

In the Claims

In Column 10, Line 10, in Claim 14, delete "server" and insert -- Server --, therefor.